United States Patent [19]

Hafer et al.

[11] 4,280,217

[45] Jul. 21, 1981

[54] TIME DIVISION SWITCHING SYSTEM CONTROL ARRANGEMENT

[75] Inventors: Edward H. Hafer, Winfield; William J. Klinger, Warrenville, both of Ill.

[73] Assignee: Bell Telephone Laboratories, Incorporated, Murray Hill, N.J.

[21] Appl. No.: 106,392

[22] Filed: Dec. 26, 1979

[51] Int. Cl.$^3$ .......................................... H04Q 11/04
[52] U.S. Cl. .................................. 370/63; 179/18 ES
[58] Field of Search ............................ 370/63, 58, 64; 179/18 ES

[56] References Cited

U.S. PATENT DOCUMENTS

| | | | |
|---|---|---|---|
| 3,912,873 | 10/1975 | Skaperda | 179/18 FC |
| 3,925,620 | 12/1975 | Edstrom et al. | 370/63 |
| 4,007,334 | 2/1977 | McDonald | 370/110 |
| 4,074,072 | 2/1978 | Christensen et al. | 370/65 |
| 4,186,276 | 1/1980 | Schlichte | 370/63 |
| 4,210,782 | 7/1980 | Fujita | 179/18 ES |

Primary Examiner—D. W. Olms
Attorney, Agent, or Firm—Kenneth H. Samples

[57] ABSTRACT

A time division switching system having distributed control processors is disclosed. The distributed processors exchange control messages and cooperate in the completion of talking paths between subscribers. Each control message includes an address portion defining the destination for the control message and is transmitted to a time-shared space division switch on the same time multiplex lines that speech representations are transmitted. Control messages are routed by the time-shared space division switch to a control distribution unit where the address portion is interpreted. When the address portion defines a distributed processor which controls the time-shared space division switch, the control distribution unit transmits the associated control message directly to that processor. Alternatively, when the address portion defines one of the other distributed processors, the control distribution unit transmits the associated control message to the defined processor via the time-shared space division switch. The switching system also includes arrangements for utilizing the control message communication features in the completion of communication paths between subscribers.

13 Claims, 10 Drawing Figures

CONTROL DISTRIBUTION UNIT

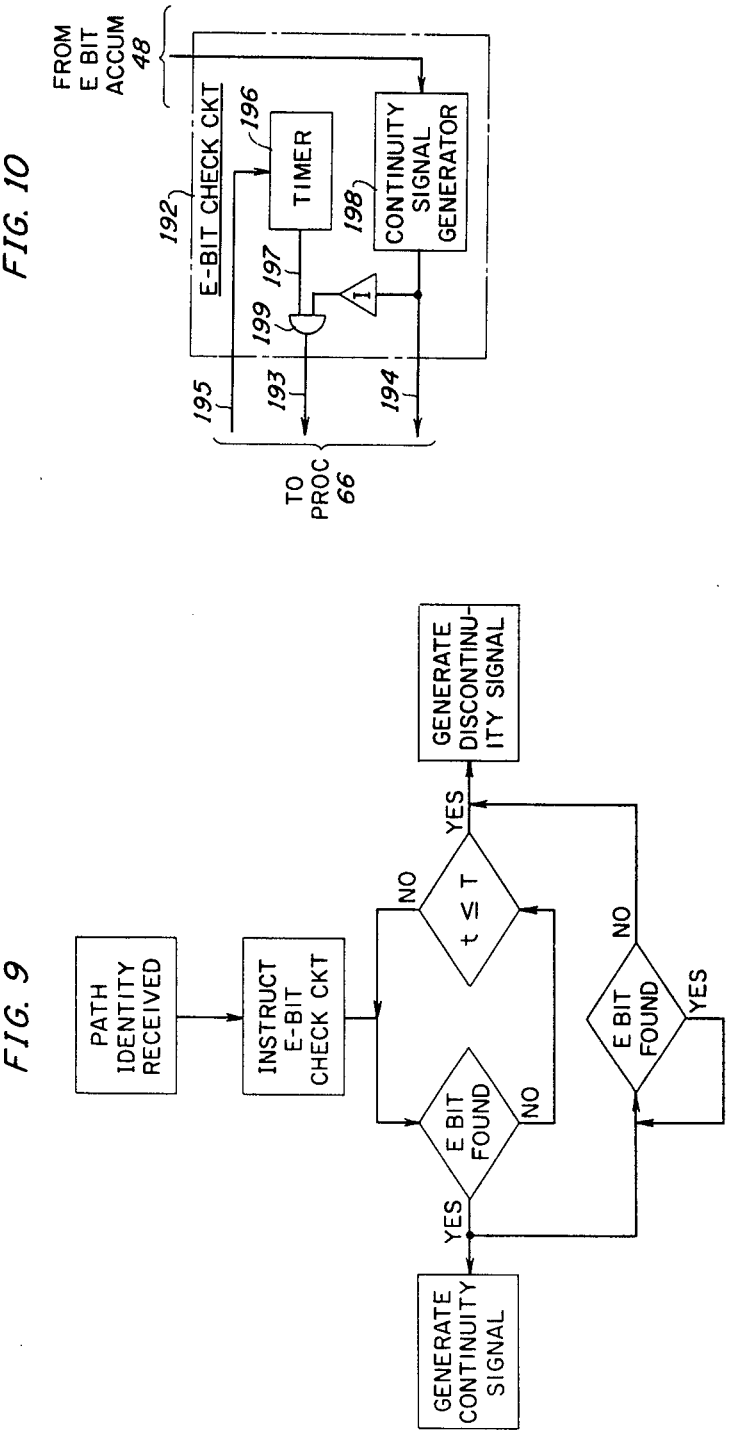

TIME DIVISION SWITCHING SYSTEM CONTROL ARRANGEMENT

CROSS-REFERENCE TO RELATED APPLICATIONS

This application is related to the following applications which were filed concurrently herewith and assigned to the assignee of the present application: the application of E. H. Hafer, application Ser. No. 106,393, filed Dec. 26, 1979, entitled "A Continuity Verification Arrangement"; and the application of H. J. Beuscher, J. H. Davis, M. N. Ransom and R. B. Walford, application Ser. No. 106,689, filed Dec. 26, 1979, entitled "Control Information Communication Arrangement For A Time Division Switching System".

TECHNICAL FIELD

This invention relates to time division switching systems, and more particularly, to arrangements for controlling the operation of such time division systems.

BACKGROUND OF THE INVENTION

Stored program controlled communication switching systems comprise some form of intelligence which controls the switching functions in response to a program stored in memory. Historically, such systems included a single processing entity for the control of the entire system. As technology and system design evolved, it was found desirable to separate certain routine functions from the main processing entity to save its processing time for more complex system functions and decisions. Systems, called distributed control systems, are presently being designed which also separate some of the more complex system functions and decisions into several intelligent processors, each of which controls associated switching system functions.

Stored program controlled switching systems include data storage areas for storing the data necessary for the completion of calls. In a distributed control system, a given call may involve more than one processor, which processors may require access to the same call related data. When all call related data is not locally associated with each processor, system level messages must be exchanged between a given processor and the storage areas storing the call related data, to locate the retrieve that data. However, when all call related data is stored in local association with each processor, called data replication, each processor has rapid access to that data without system level messages, but the total amount of data stored is much greater than if it is stored in a single location. In fact, if n processors are used, data replication may result in n times the single storage area.

Applicants propose an arrangement in which each processor is locally associated with the data relating to its primary function. Advantageous results are obtained when this data distribution arrangement is coupled with applicants' arrangement for communicating call related data and control information among the distributed processors of the system.

SUMMARY OF THE INVENTION

A time division switching system in accordance with the present invention comprises a switching arrangement, a terminating unit connected to the switching arrangement, an originating unit connected to the switching arrangement for transmitting routing information defining the terminating unit to a control arrangement which controls the switching arrangement to complete a communication path, having a unique identity, between the originating unit and the terminating unit. Applicants' invention is characterized in that the control arrangement also responds to the routing information from the originating unit by transmitting to the terminating unit a control message identifying the originating unit and the selected communication path; the terminating unit includes an arrangement for transmitting to the originating unit a control message defining the identity of the selected communication path and an arrangement for communicating over the selected communication path; and the originating unit responds to the control message from he terminating unit by communicating on the selected communication path. As additional aspects of the present invention, acknowledgement messages are communicated between the originating unit and the terminating unit utilizing the selected communication path.

BRIEF DESCRIPTION OF THE DRAWING

A more complete understanding of the present invention may be obtained from a consideration of the following description when read in conjunction with the drawing in which:

FIG. 9 is a flow diagram of the E-bit control sequence of the present embodiment; and FIG. 10 is a diagram of an E-bit check circuit used in the present embodiment.

DETAILED DESCRIPTION

Figure 1:
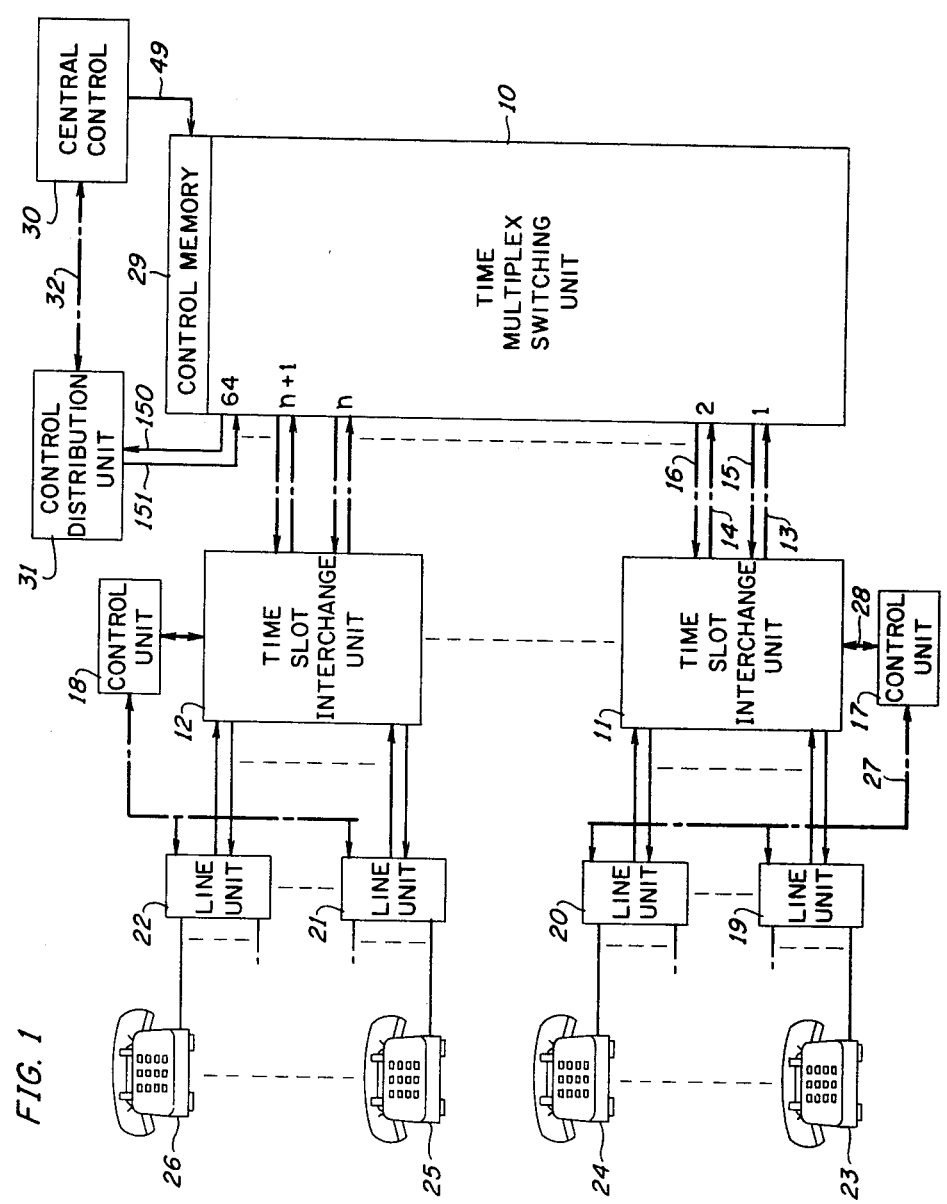
FIG. 1 is a block diagram of a system embodying the present invention.

FIG. 1 is a block diagram of a time division switching system embodying the present invention which is used to interconnect subscriber sets such as subscriber sets 23 through 26. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16.

In the description which follows, the input and output ports of time multiplex switching unit 10 are referred to as input/output port pairs. This term is used since the source for data words to an input port of a given input/output port pair is also the destination for data words from the output port of that pair. As shown in FIG. 1, input/output port pair 1 is associated with time multiplex lines 13 and 15. Each time multiplex line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time multiplex lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact nunber of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex channels used to transmit the resulting code between the line unit and its associated time-slot interchange unit are determined by the control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated chanels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time multiplex line between a time-slot interchange unit and the time multiplex switch unit 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time multiplex line between the time-slot interchange units and the time multiplex switching unit 10 under the control of control units 17 and 18.

Time multiplex switching unit 10 operates in recurring frames of time slots where each 125 microsecond frame comprises 256 time slots. During each time slot, time multiplex switching unit 10 is capable of connecting data words received at any of its 64 input ports to any of its 64 output ports in accordance with time-slot control information stored in a control memory 29. The configuration pattern of connections through time multiplex switching unit 10 repeats itself every 256 time slots and each time slot is assigned a numerical designation in sequence from 1 to 256. Accordingly, during a first time slot TS 1 the information in a channel (1) on time multiplex line 13 may be switched by time multiplex switching unit 10 to an output port 64 while during the next time slot TS 2 the next channel (2) on time multiplex line 13 may be switched to an output port n. Time-slot control information is written into control memory 29 by the central control 30 which derives this control information from control messages obtained from various control units, e.g., 17 and 18.

Central control 30 and the control units 17 and 18 exchange control messages utilizing selected channels called control channels of the time multiplex lines, e.g., 13 through 16, between the time-slot interchange units and the time multiplex switching unit 10. In the present embodiment, each control message comprises a plurality of control words and each control channel can transmit one control word per frame of 256 time separated channels. The same channel of the two time multiplex lines associated with a given input/output port pair is predefined to be a control channel. Additionally, a given channel is used as a control channel for only one pair of time multiplex lines. For example, if channel 1 is used as a control channel on time multiplex line 13 and the associated time multiplex line 15, no other time multiplex line will use channel 1 as a control channel. During each time slot having the same numerical designation as a control channel, time multiplex switching unit 10 connects the data word occupying that control channel to the 64th output port and connects the 64th input port to the output port associated with the above-mentioned control channel. The following is an example of the operation of the present embodiment when channel 1 is the control channel for time multiplex lines 13 and 15, and channel 2 is the control channel for time multiplex lines 14 and 16. During time slot TS 1 information from control memory 29 defines, among other connections, that the control word in channel 1 of time multiplex line 13 is connected to output port 64 and that the control word in channel 1 at input port 64 is connected to time multiplex line 15. Similarly, during time slot number TS 2, information from control memory 29 defines that the control word in channel 2 of time multiplex line 14 is connected to the output port 64 and that the control word in channel 2 at the input port 64 is connected to time multiplex line 16. When operating in this manner, output port 64 receives from time multiplex switching unit 10 all control words in a channel having the same numerical designation in which they were transmitted to the time multiplex switch. Further, each control channel is connected to receive control words from input port 64 during the time slot having the same numerical designation as their associated control channel. Control words switched to the 64th output port are transmitted to a control distribution unit 31, which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port 64 of time multiplex switching unit 10 in a channel having the same numerical designation as the control channel associated with the destination unit.

When operating as above described, the time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to the input port 64 during the channel having the same numerical designation as the control channel associated with time-slot interchange unit 12. A control message can also be transmitted to the central control 30 by defining central control 30 in the destination portion of the control message. When this occurs, control distribution unit 31 transmits the message to central control 30 via a communication link 32 rather than returning it to the time multiplex switching unit 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32.

Each of the control units, e.g., 17 and 18, includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal cell handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57 e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through the control distribution unit 31 is utilized to send this call related information to other control units and the central control.

Figure 2:
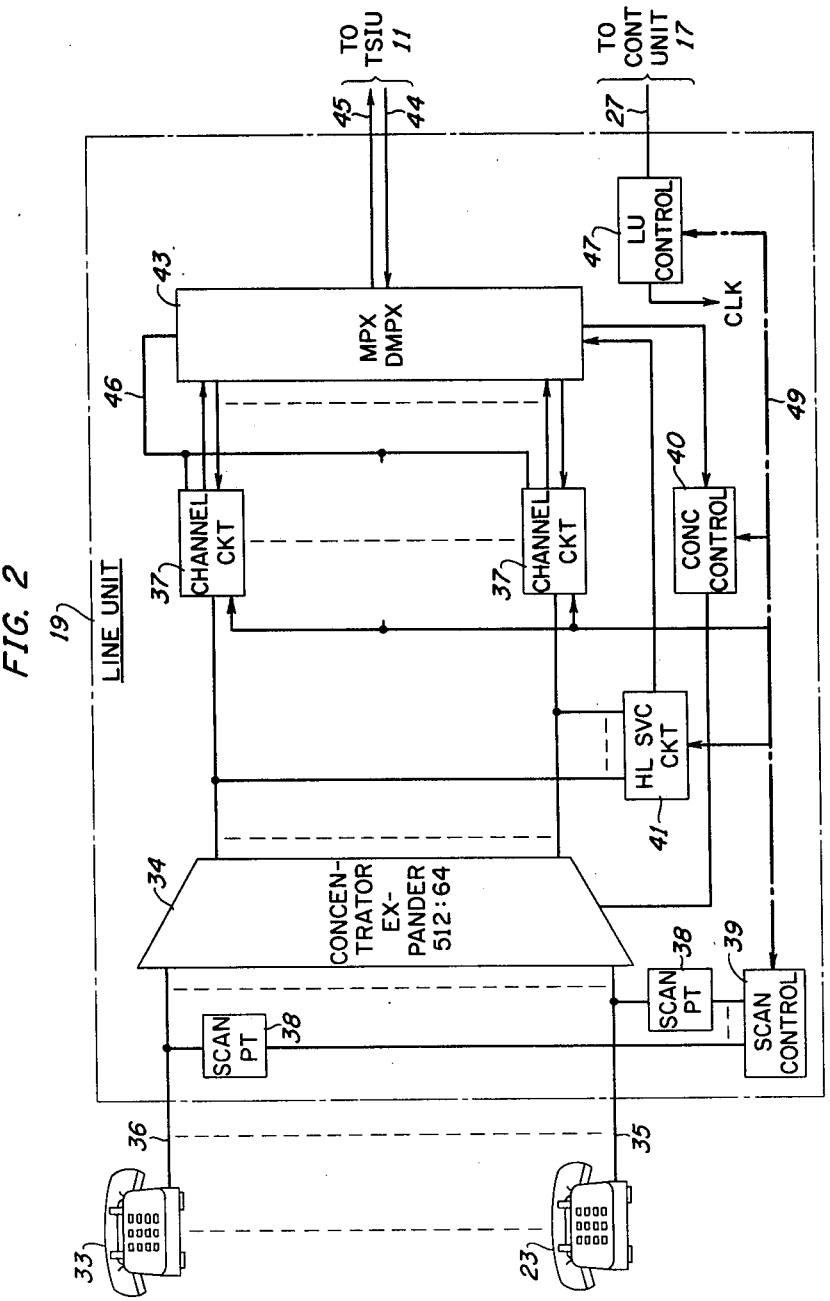
FIG. 2 is a more detailed diagram of a line unit utilized in the embodiment of FIG. 1.
Figure 6:
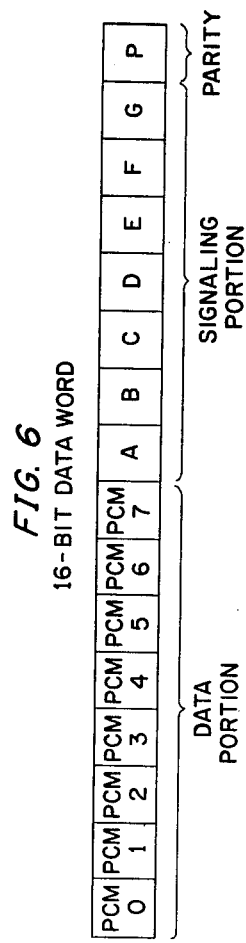
FIG. 6 is a diagram of the data words utilized in the embodiment of FIG. 1.

Line unit 19 is shown in greater detail in FIG. 2. It should be noted that all of the line units of the present embodiment are substantially identical to line unit 19. Up to 512 subscriber sets, such as subscriber sets 23 and 33, can be connected to each line unit of the present embodiment. These subscriber sets are connected to a concentrator/expandor 34 via subscriber loop circuits of a type well known in the art. Subscriber set 23 is connected to concentrator/expandor 34 via subscriber loop circuit 35 and subscriber set 33 is connected to concentrator/expandor 34 via subscriber loop circuit 36. Concentrator/expandor 34 has 512 input terminals and 64 output terminals thus providing 8 to 1 concentration and expansion. The present embodiment also includes 64 channel circuits 37 which convert analog information from the subscriber sets into digital data words before transmission to the switching system, and which convert digital information from the switching system back to analog form for transmission to the subscriber sets. Each of the channel circuits 37 is connected to one of the output terminals of concentrator/expandor 34. Each of the output ports of concentrator/expandor 34 is also connected to a high-level service circuit 41 which is used, for example, to provide ringing current to the subscriber sets. Each of the channel circuits 37 samples the analog signals from its associated output terminal of concentrator/expandor 34 at an 8-kilohertz rate and converts those samples to 8-bit PCM representations of the analog samples. This 8-bit PCM representation is used as a part of the data word transmitted to the time-slot interchange unit 11. Each data word as shown in FIG. 6 is 16 bits in length and comprises an 8-bit PCM data portion, a 7-bit signaling portion, and a parity bit. The signaling portion is used to convey signaling information about the channel circuit or the subscriber set to which it is connected. For example, the A-bit of the signaling portion is used to transmit the present DC state of the associated subscriber set to the time-slot interchange unit 11.

The data words are transmitted from the channel circuit 37 to a multiplex/demultiplex circuit 43 which is connected to transmit and receive time multiplex digital information to and from time-slot interchange unit 11. Multiplex/demultiplex circuit 43 transmits digital information to time-slot interchange unit 11 on time multiplex line 45 in 125 microsecond frames each comprising 64 channels of 16 bits each. Each channel transmitted on time multiplex line 45 is uniquely associated with one of the channel circuits 37 and is used to convey information from that channel circuit to the time-slot interchange unit 11. Multiplex/demultiplex circuit 43 operates in the manner well known in the art to transmit the 16-bit data words from each of the channel circuits 37. Multiplex/demultiplex circuit 43 receives digital information from the time-slot interchange unit 11 via a time multiplex line 44 in a format substantially identical to the format on time multiplex line 45. When operating s a demultiplexor, multiplex/demultiplex circuit 43 transmits the data word received in each channel on time multiplex line 44 to the one of channel circuits 37 uniquely associated with that channel. The particular channel circuit 37 which is to receive the channel is determined by the position of that channel within a frame of such channels. The channel circuit 37 then decodes the 8-bit PCM data word and transmits the resulting analog signal to its associated subscriber via the concentrator/expandor 34. Multiplex/demultiplex circuit 43 also includes a clock regeneration circuit (not shown) which generates clock signals from the signals on time multiplex line 44 in a manner well known in the art. These clock signals are used to control timing in the multiplex/demultiplex circuit 43 and transmitted via a conductor 46 to the channel circuits 37 to control the timing thereof.

As previously stated, control unit 17 controls many of the operations performed by each of the line units. The main processing entity of control unit 17 is a processor 66 (FIG. 3) which operates in response to instructions stored in a memory 57. Control unit 17 also includes a control interface circuit 56 which receives instructions from the processor 66 via a bus 59 and in response thereto, communicates with the line units, e.g., 19 and 20 via the control bus 27. Control bus 27 comprises a plurality of communication paths at least one of which is uniquely associated with each line unit. Each line unit includes a line unit controller which is connected to the control bus 27. In the present embodiment, line unit 19 includes a line unit controller 47 (FIG. 2). Most communication between control unit 17 and line unit controller 47 is initiated by read or write orders from control unit 17. A read order is a direction to read some identifiable information in line unit 19 and comprises a single bit read indication and the address of the particular information to be read. A write order is a direction to write information into some unit in line unit 19 and comprises a write address, the information to be written, and a 1-bit write code. The particular unit to be written into or read from may be the scan controller 39, the concentrator controller 40 or the high-level service circuit 41. Line unit controller 47 partially decodes each order from control unit 17 and directs the remainder of the order and the read/write indicator bit to the particular unit addressed. The particular unit addressed responds to the address portion transmitted from control unit 17 and the read/write bit by reading or writing the storage location identified by the address portion. The information read from a particular unit in line unit 19 is returned to line unit controller 47 and transmitted thereby to control unit 17.

Each subscriber loop e.g., 35 and 36, includes a scan point 38 which indicates the DC conduction state of its associated subscriber loop. Control unit 17 periodically scans the subscriber loops associated with the subscriber sets of the switching system by transmitting to the line units of FIG. 1 read orders defining a number of scan points to be read. In the present embodiment such a scan order is received by line unit controller 47 which transmits the address and read/write bit portions of the order to scan control unit 39. The scan control unit 39 formulates a reply for the control unit 17 which consists of the present DC conduction state of the subscriber loops indicated by ones of scan points 38 identified in the address portion. Control unit 17 checks the information transmitted from scan control unit 39 to determine if any of the subscriber sets have changed state. If, for example, one of the subscriber sets has gone off-hook since the last scan, it is necessary to provide a communication path from that subscriber set through concentrator/expandor 34 to an available one of channel circuits 37. Accordingly, control unit 17 transmits a write order to concentrator control circuit 40 which responds thereto by connecting a subscriber set, e.g., subscriber set 33, to a predefined output terminal of concentrator/expandor 34. No reply is required in response to a write order, however, it may be found that the return to an all-seems-well signal to control unit 17 will aid in maintaining the "sanity" of the overall system.

As previously stated, the output signals of multiplex/demultiplex circuit 43 consist of recurring frames each comprising 64 digital channels of 16 bits each. This information is transmitted to a multiplex unit 60 (FIG. 3) within time-slot interchange unit 11. Multiplex circuit 60 receives the output signals from eight line units which signals are reformatted and transmitted on an output time multiplex line 62 having 512 channels for each 125 microsecond frame. Similarly, a demultiplex circuit 61 receives 512 channels of 16-bits each on a time multiplex line 63 which channels are distributed in a predetermined arrangement to eight line units such as line unit 19. Further, multiplex unit 60 converts incoming channels of information from serial to parallel form and demultiplexor 61 converts the information it receives from parallel to serial form. The information transmitted in a given channel on time multiplex line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchange 50 which is to store that data word. Data words are also read from receive time-slot interchange 50 at the rate of one data word per time slot. The memory address of the data word to be read from receive time-slot interchange 50 during a given time slot is obtained by reading control RAM 55. Control RAM 55 is read once per time slot at an address defined by the time-slot designation from time-slot counter 54 and the quantity so read is transmitted to receive time-slot interchange 50 as the read address for that time slot. Data words read from receive time-slot interchange 50 are transmitted to the time multiplex switch via a time multiplex line 68 and an interface unit 69. Data words from time multiplex switch unit 10 are received by time-slot interchange unit 11 via the interface unit 69 and are applied to time multiplex line 70. Time multiplex line 70 is connected to transmit time-slot interchange 53 which stores the incoming data words in a location defined by an address from control RAM 55. Data words are read from transmit time-slot interchange 53 at the address defined by the time-slot counter 54. Data words so read are transmitted on time multiplex line 63 for transmission to the line unit 19. It should be noted that control RAM 55 may be implemented as a number of control memories each associated with a particular circuit, e.g., transmit time-slot interchange 53. The particular configuration of control memories is not important to the present invention and may vary depending on timing and circuitry requirements within the time-slot interchange unit 11. The general principles of time-slot interchange as performed by the receive time-slot interchange 50, the control RAM 55, the time-slot counter 54 and the transmit time-slot interchange 53 are well known in the art and are not described in greater detail herein. One arrangement for reading and writing data words in time-slot memories is described in detail in U.S. Pat. No. 4,035,584, J. W. Lurtz.

Figure 3:
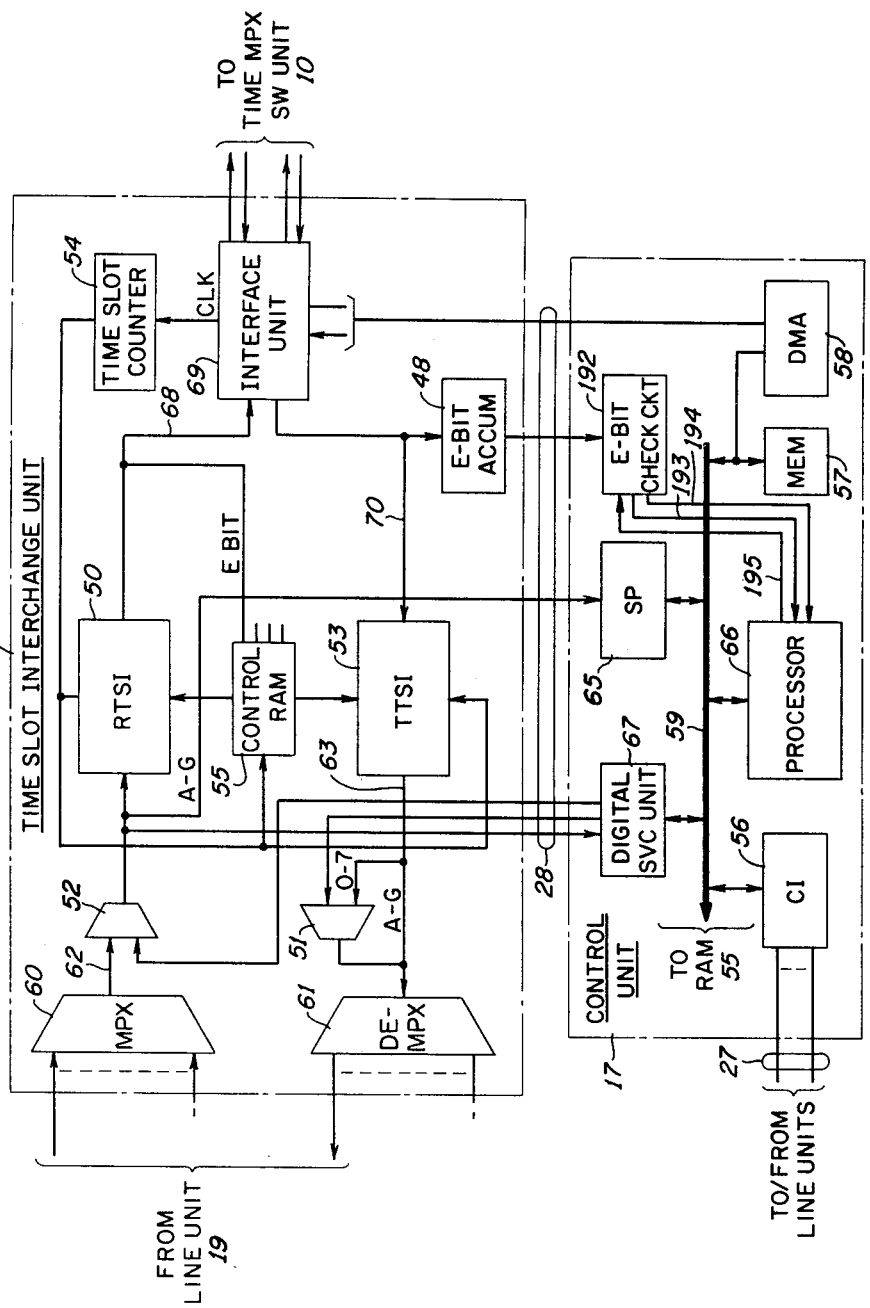
FIG. 3 is a more detailed diagram of the time slot interchange unit and associated control unit utilized in the embodiment of FIG. 1.

Each data word on time multiplex line 62 is stored in time-slot interchange 50 as above described. In addition to storage in time-slot interchange 50 the signaling portion (bits A through G) of each data word received by the time-slot interchange unit 11 is transmitted to a signal processor 65 which is a part of control unit 17 (FIG. 3). Signal processor 65 reduces the real time load requirement of processor 66 by receiving and analyzing bits A through G. For example, signal processor 65 analyzes the A-bit of each data word, which bit indicates the DC state of associated subscriber set, to determine if a subscriber set has gone on-hook or if a valid dial pulse has been sent. When an on-hook status or a dial pulse is detected, the signal processor 65 transmits to processor 66 a signal indicating the information obtained. Processor 66 accumulates the information from signal processor 65 and responds by exercising control over the switching system in a manner to be described in greater detail later herein.

The embodiment of FIG. 3 also includes a digital service unit 67 which receives the data portion (FIG. 6) of each data word transmitted on time multiplex line 62. Digital service unit 67 is used primarily to receive and analyze tone signals from the subscribers which have been converted by a channel circuit 37 into PCM signals and to transmit tones and signals in PCM format. Digital service unit 67 comprises a memory (not shown) which has at least 65 storage locations to receive data portions of data words from time multiplex line 62. The data portion of each data word read from time multiplex line 62 is written into a location of digital service unit 67 defined by an address read from control RAM 55. Only 64 channels can be actively transmitting information to be utilized by the digital service unit 67. The data words from all other channels are written into the 65th memory location of digital service unit 67 where they are ignored. Digital service unit 67 reads the data words so stored, determines what signals are being received and communicates the identity and nature of those signals to processor 66. Processor 66 determines what action should be taken in response to the received signals.

Digital service unit 67 also transmits tones to the subscriber sets via time multiplex line 63 in the channel associated with that subscriber set. These tones, in PCM form, are transmitted from digital service unit 67 to a first input port of a gating circuit 51 during the time slot associated with the receiving subscriber. The other input port of gating circuit 51 is connected to receive the data portion of each data word read from transmit time-slot interchange 53. A gate control bit is read from control RAM 55 and transmitted to gate circuit 51 during each time slot to define that either the data portion from transmit time-slot interchange 53 or the data portion from digital service circuit 67 is to be transmitted to demultiplexor 61. In the present embodiment a logical "1" gating bit defines the digital service unit 67 as the source of the data portion and a logical "0" defines transmit time-slot interchange 53 as the source.

In addition to transmitting PCM encoded tones to its associated line unit, each time-slot interchange unit can transmit such tones toward time multiplex switch unit 10. This ability exists since, as described in greater detail later herein, audible ring tone for an originating subscriber is generated in the time-slot interchange unit associated with the terminating subscriber. The incoming time multiplex line 62 is connected as one input to a gating circuit 52 which is the point of insertion for tones to be transmitted toward the time multiplex switch unit 10. The other input of gating circuit 52 is connected to an output terminal of the digital service unit 67. Gating circuit 52 and digital service unit 67 operate in the manner previously described with respect to gating circuit 51, to place tones in predefined ones of the time multiplex channels on time multiplex line 62.

The PCM encoded representations of a given tone to be transmitted toward time multiplex switch 10 are placed in the same channel of time multiplex line 62 and are, accordingly, stored in the same addressable location of receive time-slot interchanger 50. In order to apply these tones to a given channel on outgoing multiplex line 68, control RAM 55 is controlled by processor 66 to generate the read address of the tone storing addressable location during the time slot associated with that channel. For example, audible ring tones may be placed in channel 512 of time multiplex line 62 resulting in their storage in the 512th addressable location of receive time-slot interchange 50. Whenever time-slot interchange unit 11 is to transmit audible ring tone in a given channel, processor 66 places the address 512 in the time-slot location of control RAM 55 associated with that given channel. Accordingly, each occurrence of the given channel will receive a PCM representation of audible ringing. When audible ringing is to terminate, processor 66 changes the address stored by control RAM 55 at the time-slot location associated with the given channel.

The following is a description of the interaction of signal processor 65, processor 66, and digital service unit 67. It is assumed for this description that a subscriber utilizing tone dialing has gone off-hook, and has been assigned to a channel circuit in the manner previously described with regard to line unit 19. After a channel circuit has been assigned, supervision is transferred to the digital service unit 67 and signal processor 65. By reading the signaling portion of the data word in the assigned channel, the signal processor 65 monitors the DC state of the subscriber set and communicates any changes to the processor 66. Further, processor 66 via bus 59 writes a logical "1" into the gating bit position of control RAM 55 associated with gating circuit 51 in the time slot of the channel associated with the newly off-hook subscriber. This defines that the output signals from digital service unit 67 are to be transmitted to demultiplexor 61 via gating circuit 51 during the time slot associated with the newly off-hook subscriber. Additionally, processor 66, via bus 59, instructs digital service unit 67 to read from its internal storage the PCM representation of dial tone during the time slot associated with the newly off-hook subscriber. Accordingly, the dial tone is transmitted to demultiplexor 61 in the channel associated with the newly off-hook subscriber. Processor 66 also instructs digital service unit 67 to accumulate the data portion of each channel on time multiplex line 62 which is associated with the newly off-hook subscriber. In this manner dialed digits will be detected by digital service unit 67. Information regarding dialed digits and DC status of the particular subscriber set is transmitted to the processor 66 which terminates the transmission of dial tone and continues to accumulate dialed digits.

The primary mode of control information exchange in the present embodiment comprises the transmission of control messages from a source time-slot interchange unit through the time multiplex switch 10 and the control distribution unit 31 and back to the destination time-slot interchange unit. A secondary mode of communication is also used whereby control information with regard to a given call is transmitted from the source time-slot interchange unit to the destination time-slot interchange unit via the time multiplex switch 10 utilizing the time slot assigned for that call. In the present embodiment, the E-bit position of the data word in the call time slot is used for the secondary mode communication. However, it can be seen that any or all of the signaling bits could be used in this secondary communication mode. In the present embodiment, the E-bit serves the dual purposes of communication path continuity check and signal acknowledgment. Control RAM 55 includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchange 50, it transmits the stored E-bit on time multiplex line 68 in place of the E-bit stored in receive time-slot interchange 50. This allows the transmission of messages utilizing the E-bit channel between time-slot interchange units. The arrangement in FIG. 3 also includes an E-bit accumulator 48 which receives the E-bit of each data word received on time multiplex line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 9 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

FIG. 10 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary. The use of the E-bit channel in implementing call completion is discussed in greater detail later herein.

The following is a description of the primary mode of communication between the various control entities of the switching system. Processor 66, in response to a complete dialed number, performs translations with regard to that dialed number and formulates a control message for central control 30 (FIG. 1 so that an idle time slot for the call can be established through time multiplex switch unit 10. This control message is stored in memory 57 by processor 66. A DMA unit 58 of a type well known in the art reads the control message at the rate of one control word per frame and transmits that word to a control word source register 80 (FIG. 4) in interface unit 69 for transmission on the time multiplex line to time multiplex switch 10. Similarly, control messages are received from other control units and the central control 30 at a control word destination register 92 (FIG. 4) in interface unit 69 and transmitted by DMA unit 58 to the memory 57 where they are read by processor 66. Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchange unit 50 via time multiplex line 68 and to transmit data words to transmit time-slot interchanger 53 via time multiplex line 70. It will be remembered that both time multiplex lines 68 and 70 convey data words at the rate of 512 channels per 125 microsecond frame. Multiplex/demultiplex circuit 75 splits the information received on time multiplex line 68 into two time multiplex lines 76 and 77 by transmitting the data words in each even-numbered channel on time multiplex line 77 and by transmitting each odd-numbered channel on time multiplex line 76. Each of the time multiplex lines 76 and 77 thus conveys information at the rate of 256 channels per frame. Additionally, multiplex/demultiplex circuit 75 combines the information on two 256 channel time multiplex lines 85 and 86 onto the 512 channel time multiplex line 70. This combination occurs by alternatingly transmitting the data words from time multiplex lines 85 and 86 such that the data words from time multiplex line 85 are transmitted in the odd-numbered channels of time multiplex line 70 while data words from time multiplex line 86 are transmitted in even-numbered channels. In the present embodiment, time multiplex lines 76 and 85 are connected to link interface 78, and time multiplex lines 77 and 86 are connected to link interface 79. It should be noted that the time-slot interchange unit 11 operates on the basis of 512 time slots (channels) per frame while the link interfaces 78 and 79 and the time multiplex switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time multiplex line 68 are delayed by multiplex/demultiplex circuit 75 so that the odd-numbered channel and the immediately following even-numbered channel are transmitted on a respective one of time multiplex lines 76 and 77 substantially simultaneously. Similarly, each data word from link interface 79 on time multiplex line 86 is delayed by multiplex/demultiplex circuit 75 such that it is transmitted on time multiplex line 70 immediately after the data word received by multiplex/demultiplexor 75 substantially simultaneously therewith. In the course of the following description, the time slot of a given data word refers to its time slot with respect to link interfaces 78 and 79 and the time multiplex switch 10. For example, data words from channels 1 and 2 of time multiplex line 68 are both associated with time slot 1 of the link interfaces 78 and 79 and the time multiplex switch 10. Each of the link interface units 78 and 79 is uniquely associated with one input/output port pair of time multiplex switch 10.

Link interface 78 (FIG. 4) includes the receiver 82 which receives data words transmitted serially from time multiplex switch 10 via time multiplex line 15 and serially retransmits this information on a conductor 83. A clock recovery circuit 84 receives the incoming bit stream by connection to conductor 83 and recovers a 32.768 megahertz clock signal therefrom. This clock signal is used to provide timing for the link interface circuit 78. For reasons to be described in greater detail later herein, the information received on time multiplex line 15 is not necessarily in channel synchronization with that transmitted on time multiplex line 13. In order to achieve channel synchronism between the data words on time multiplex lines 76 and 85, the incoming data words on conductor 83 are buffered in a random access memory circuit 87. The data words on conductor 83 are written into random access memory 87, at a location defined by a write address generator 88. Write address generator 88 receives a 2.048 megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is a predetermined number of addresses behind those generated by the write address generator 88. In the present embodiment, the read address generator 89 is approximately one-fourth of a frame (64 time slots) behind the addresses generated by the write address generator 88.

Link interfaces 78 and 79 of interface unit 69 operate in a master slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time multiplex lines 15 and 16, more or less than one-quarter frame of information may separate the write addresses and read addresses utilized in link interface 79. This occurs since the data words transmitted on time multiplex lines 85 and 86 are in channel synchronism while no such synchronism is required on time multiplex lines 15 and 16.

The same channel is used in a given link interface to both transmit and receive control messages. The particular channel used by given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control message source register 80 and to a control message destination register 92. Control message destination register 92, in response to the gating signal from comparator 91, stores the information on time multiplex line 85. During that particular channel, the information on time multiplex line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time multiplex line 76, thus transmitting the control word. Control words are transmitted are received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchanger 11. The data word including this framing bit is then transmitted via a parallel serial register 95 and a driver circuit 96 to time multiplex line 13 which is connected to a unique input port of time multiplex switch 10. Each data word received by line interface 78 includes a framing bit which is generated and transmitted by the time multiplex switch 10. A frame checker 97 reads each framing bit of each data word from time multiplex switch 10 and determines if the communication between time multiplex switch 10 and itself is still in synchronism. If synchronism exists, no corrections are made; however, if synchronism is found not to exist, reframing is accomplished by communication with the clock recovery circuit 84 in a manner well known in the art.

Figure 5:
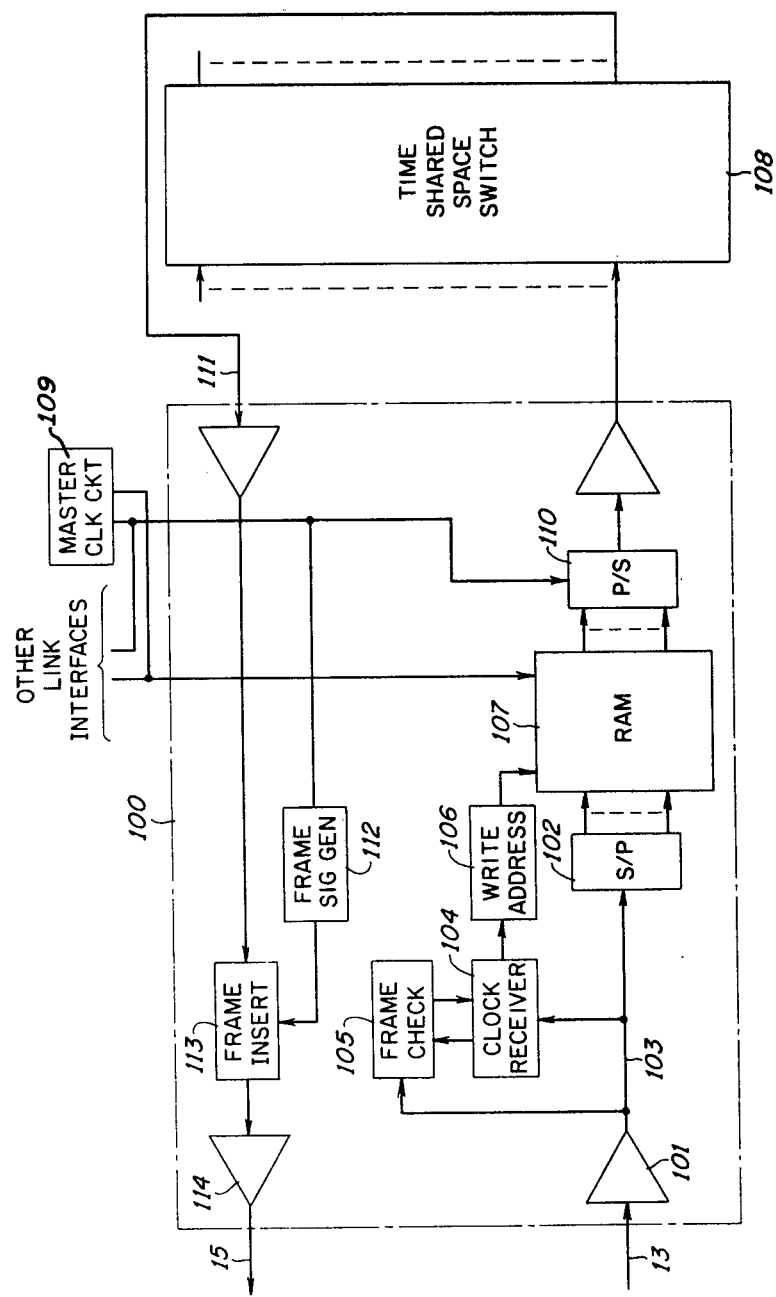
FIG. 5 is a diagram of a link interface unit of a time multiplex switching unit which is utilized for communication with a time-slot interchange unit of the embodiment of FIG. 1.

The input and output ports of time multiplex switch 10 can be considered in pairs for both ports are connected to the same line interface. Further, each pair of input and output ports of the time multiplex switch 10 is connected to a time multiplex switch link interface of a type similar to link interfaces 78 and 79. In the present embodiment, link interface 78 is connected to a time multiplex switch link interface 100 (FIG. 5). Time multiplex switch link interface 100 includes a receiver 101 which receives data words from time multiplex line 13 and transmits these data words to a serial-parallel register 102 via a time multiplex line 103. The bit stream from time multiplex line 103 is also applied to a clock recovery circuit 104 and a frame check circuit 105 which derive clock signals therefrom and determine if frame synchronism is present, respectively. Time multiplex switch link interface 100 further includes a write address generator 106 which generates a sequence of write addresses in response to signals from clock receiver circuit 104. Each data word transmitted to serial-parallel register 102 is then written into a random access memory 107 at the address generated by write address generator 106.

Time multiplex switch 10 also includes the time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 1) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time multiplex switch 10 includes a master clock circuit 109 for generating a recurring sequence of 256 read addresses which are transmitted to each random access memory of each time multiplex switch link interface substantially simultaneously. Accordingly, random access memory 107 and the equivalent random access memories included in all other time multiplex switch link interfaces read a data word associated with the same time slot at substantially the same time. In the present embodiment, the data words read from random access memory 107 are transmitted to a parallel-serial shift register 110 from which they are transmitted to time-shared space division switch 108.

All data words to be transmitted on time multiplex line 15 to link interface 78 are received from the time-shared space division switch 108 on a conductor 111 within one time slot of their transmission into time-shared space division switch 108. Time multiplex switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time multiplex line 15.

Figure 4:
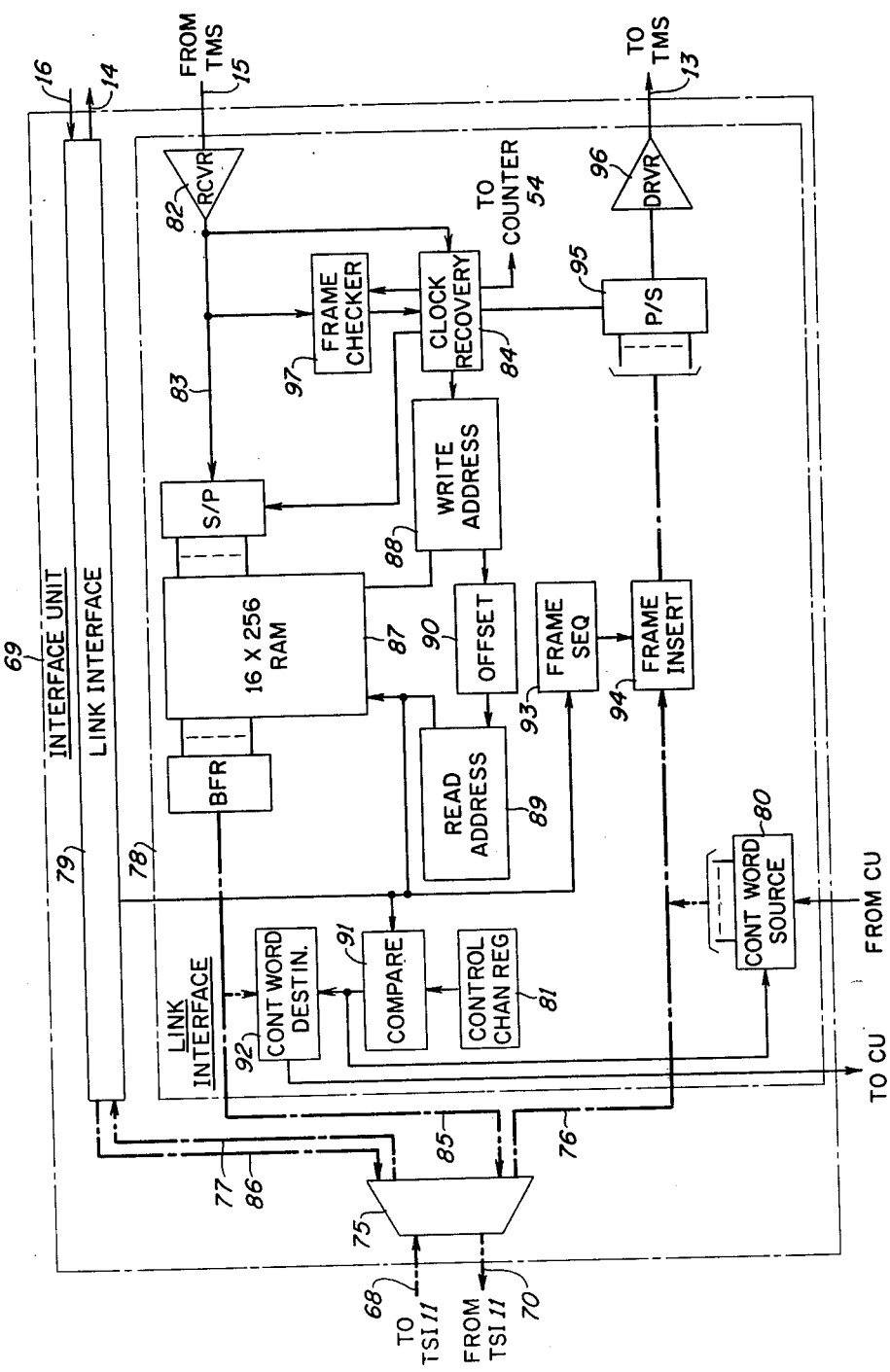
FIG. 4 is a diagram of a link interface unit included within each time slot interchange unit which is utilized for communication with the time multiplex switching unit of the embodiment of FIG. 1.

Each control time slot is transmitted by time multiplex switch 10 (FIG. 1) to the control distribution unit 31 via time multiplex lines 150 and 151 which are connected to input/output port pair 64. In the course of the following description, control time slots from a given control unit are referred to as transmit control time slots while control time slots to a given control unit are referred to as receive control time slots. Control distribution unit 31 which is shown in greater detail in FIG. 7 includes a link interface circuit 152 which is substantially identical to link interface circuit 78 (FIG. 4). The link interface circuit 152 does not contain the control word source register 80, the control channel register 81, the compare circuit 91 or the control word source designation register 92 (FIG. 4), since the functions performed by these circuits are not required in the control distribution unit 31. Each control word received on time multiplex line 150 is transmitted in parallel from the link interface circuit 152 to a control distribution unit input circuit 153 in the transmit control time slot associated with that control word. The time slot designation of each control word transmitted to the control distribution unit input circuit 153 is substantially simultaneously transmitted via a communication path 154 to a timing circuit 155. The time-slot designations so transmitted are generated by a read address generator (not shown) of link interface 152 which is the equivalent of read address generator 89 of link interface 78 (FIG. 4). Control distribution unit input circuit 153 is essentially a demultiplexor having one input port and 256 output ports. Each control word received at the input port of control distribution unit input circuit 153 is transmitted to the unique one of 256 output ports defined by the time-slot designation transmitted on communication path 154.

The present embodiment includes thirty-one time-slot interchange units, e.g., 11 and 12, each having access to two transmit and two receive control time slots. Accordingly, the information transmitted to link interface circuit 152 on time multiplex line 150 will include at most 62 transmit control time slots. Similarly, time multiplex line 151 will convey, at most, 62 control time slots back to time multiplex switch 10. Control distribution unit input circuit 153 thus requires only 62 active output ports. In the present embodiment these active output ports are associated with the first 62 time slots of a frame and are referred to by the designations TS 1 through TS 62. The output port of control distribution unit input circuit 153 associated with time slot TS 1 is connected to a buffer register 158 and the output port associated with time slot TS 62 is connected to a buffer register 159. The control circuitry 185 associated with transmit control time slot TS 1 is substantially identical to the control circuitry for the remaining 61 transmit control time slots. Accordingly, only the control circuitry 185 associated with time slot TS 1 is described in detail herein. Buffer register 158 is connected to the data input terminal of a first-in/first-out buffer 160 which buffer responds to a logical "1" pulse at its write control terminal W to write into its first storage cell the contents of buffer register 158. In accordance with well-known principles of first-in/first-out buffers, any information placed in the first storage cell "ripples" to the last unoccupied storage cell where it is held until the information is read from the first-in/first-out buffer. First-in/first-out buffer 160 further includes a read control terminal R. In response to a logical "1" pulse at this read control terminal R, the contents of the last memory cell are transmitted from the first-in/first-out buffer and the contents of all other cells of the buffer are shifted one cell toward the output.

It will be remembered that each control message from the time-slot interchange unit, e.g., 11, begins with a start character and ends with an end character. The contents of buffer register 158 are continuously transmitted to a start comparator 162 and an end comparator 163. Start comparator 162 includes a comparison circuit and a register which stores the start character. When the contents of buffer register 158 matches the stored start character, start comparator 162 transmits a logical "1" to the set input of a flip-flop 164. Whenever flip-flop 164 is in the set state, it generates a logical "1" on its logical "1" output terminal which is transmitted to an AND gate 165. The output terminal of AND gate 165 is connected to the write control terminal W of first-in/first-out buffer 160. The other input of AND gate 165 is connected to a terminal $t_2$ of timing circuit 155. Timing circuit 155 transmits from terminal $t_2$ a series of pulses occurring at the rate of one pulse per frame during a time $t_2$ which occurs during time slot TS 2. Timing circuit 155 includes a one out of n decoder which receives the time-slot designations transmitted on communication path 154 and applies a logical "1" pulse to the unique one of its 256 output terminals corresponding to the incoming time-slot designation. The particular one of these terminals which receives the logical "1" pulse during time slot TS 2 is transmitted as signal $t_2$ to the input of AND gate 165.

After the reception of a start character in buffer register 158, a new control word will be placed in buffer register 158 during time slot TS 1 of each frame. Further, each pulse $t_2$ transmitted to control terminal W of first-in/first-out buffer 160 causes the contents of buffer register 158 to be stored in the first storage cell of first-in/first-out buffer 160. This action continues until the end character is stored in buffer register 158.

End comparator 163 includes a comparator circuit and a register storing the end character. End comparator 163 generates a logical "1" output pulse when the character stored in buffer register 158 is found to match the end character stored in end comparator 163. This logical "1" output pulse is transmitted via a delay unit 166 to the reset input of flip-flop 164. Delay unit 166 delays logical "1" pulse for a period of time greater than one time slot. When the logical "1" is received by flip-flop 164, that flip-flop resets causing a logical "0" to be applied to its logical "1" output terminal which inhibits AND gate 165 from transmitting any further $t_2$ timing pulses to the control terminal W of first-in/first-out buffer 160.

End comparator 163 upon the detection of the end character in register 158 also transmits a flag signal to a CDU controller 168 over a bus 167. This flag signal defines that a completed control message has been received by first-in/first-out buffer 160. CDU control 168, in response to each flag signal from control circuit, e.g., 185, reads the entire control message from the first-in/first-out buffer storing that control message. In the present embodiment, CDU control 168 initiates such a reading operation by transmitting a 6-bit code defining which first-in/first-out buffer contains the control message to be read to a one out of 64 decoder 169. One out of 64 decoder 169 responds to the 6-bit code from the control distribution unit control 168 by applying a logical "1" to an AND gate associated with the read control circuitry of the first-in/first-out buffer storing a control message. In the present example, first-in/first-out buffer 160 is storing a control message. Accordingly, the 6-bit code transmitted to one out of 64 decoder 169 defines AND gate 170 which is associated with first-in/first-out buffer 160. In response to this 6-bit code, one out of 64 decoder 169 transmits a logical "1" to AND gate 170. Additionally, control distribution unit controller 168 transmits a series of pulses at a 2-megahertz rate to the other input of AND gate 170. It should be noted that the series of 2-megahertz pulses is also transmitted simultaneously to equivalent AND gates in the other control circuits. Since AND gate 170 is receiving a logical "1" from decoder 169, the 2-megahertz pulses are transmitted by AND gate 170 to the read control terminal R of first-in/first-out buffer 160. In response to each of these pulses a control word is read from first-in/first-out buffer 160 and transmitted to the CDU controller 168 via a bus 176. When the CDU controller 168 detects an end character in the information it receives from bus 176, it terminates the transmission of the 2-megahertz pulses. CDU controller 168 includes a memory circuit which is utilized to store each control word read from one of the receive first-in/first-out buffers, e.g., 160 and 161. When a complete control message is received and stored, the CDU controller 168 reads the destination portion of that control message to determine if the control message is to be transmitted to the central control 30 or to one of the control units, e.g., 17 and 18. When the destination portion of the control message defines the central control 30, control distribution unit control 168 reads the control message from its internal storage and transmits that control message to central control 30 via communication path 32. Alternatively, when the destination portion defines a control unit the control distribution control 168 computes the particular receive control time slot associated with that defined control unit. The particular receive control time slot is determined from a translation table stored within the control distribution unit controller 168.

Figure 7:
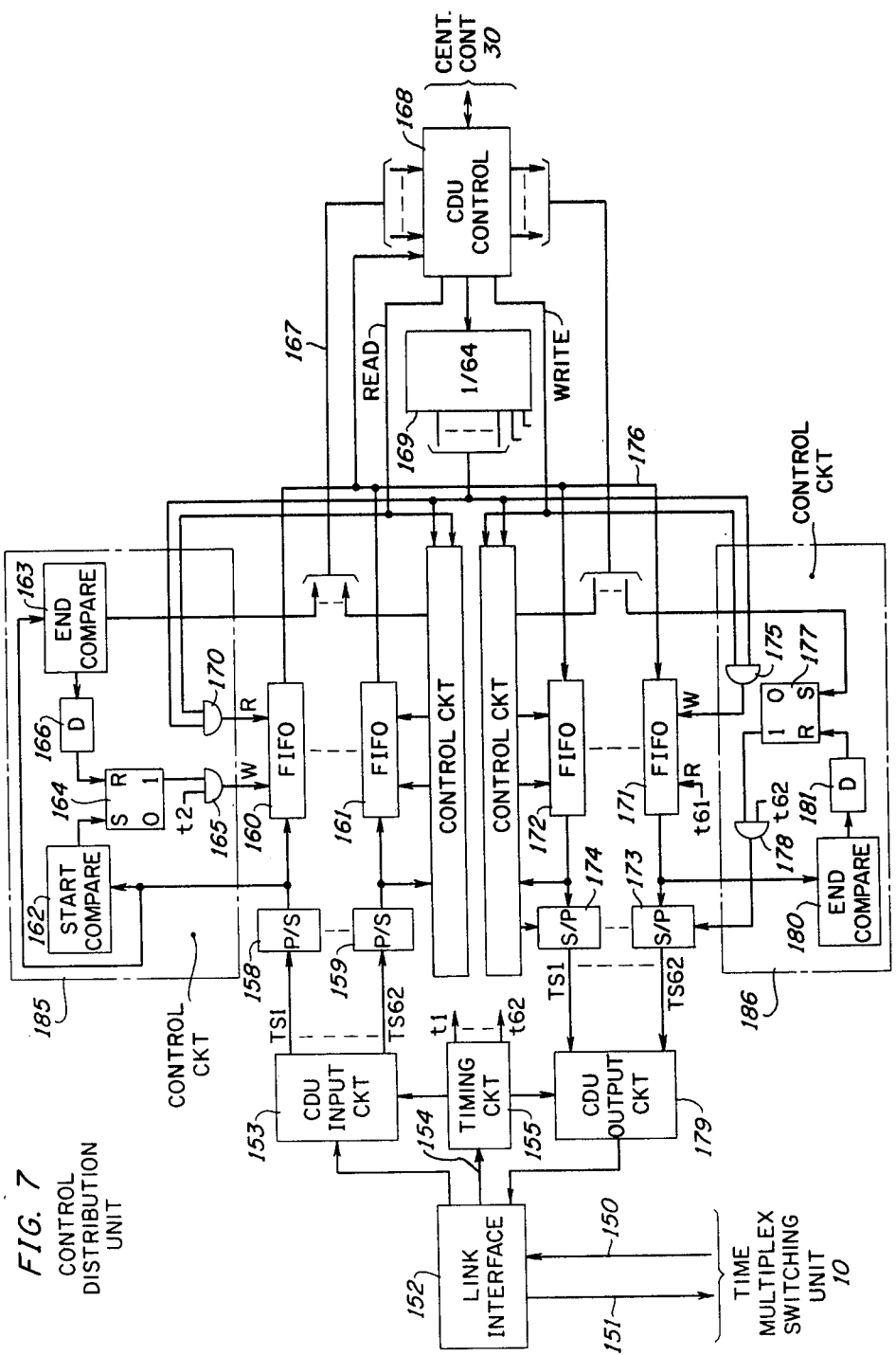
FIG. 7 is a more detailed diagram of the control distribution unit of the emodiment shown in FIG. 1.

Control distribution unit 31 in the present embodiment includes a second plurality of first-in/first-out buffers of which first-in/first-out buffers 171 and 172 are shown in FIG. 7. First-in/first-out buffers 171 and 172 are associated with a respective one of output registers 173 and 174. Each first-in/first-out buffer and its associated output register are utilized to transmit control words to the time multiplex switch 10 in the receive control time slot associated with the destination defined by each control message. In the present example, it will be assumed that the control message transferred from first-in/first-out buffer 160 to control distribution unit 168 is destined for a module which utilizes time slot 62 (TS 62) as a receive control time slot. Control distribution unit transmits to one out of 64 decoder 169 a 6-bit code uniquely defining the control circuitry 186 associated with first-in/first-out buffer 171. The logical "1" generated by one out of 64 decoder 169 is applied to an AND gate 175 the output terminal of which is connected to the write control terminal W of first-in/first-out buffer 171. Additionally, CDU controller 168 begins to read each control word of the control message and apply it to bus 176 which is connected in common to all of the first-in/first-out buffers, e.g., 171 and 172. Substantially, simultaneously with the transmission of each control word to the first-in/first-out buffers, control distribution unit control 168 transmits a logical "1" pulse to AND gate 175 and the equivalent AND gates in each of the other control circuits. Since only AND gate 175 receives a logical "1" from one out of 64 decoder 169, only it passes the logical "1" pulses from control distribution unit controller 168 to terminal W of its associated first-in/first-out buffer 171. In response to each logical "1" pulse received at its write control terminal W, first-in/first-out buffer 171 writes the control word on bus 176 into its input storage cell. As previously described, these control words "ripple" to the output storage position of the buffer. The read control terminal R of first-in/first-out buffer 171 is connected to timing circuit 155 such that it receives signals $t_{61}$. Accordingly, during each $t_{61}$ time slot, the control word in the last storage position of first-in/first-out buffer 171 is transmitted to the output register 173.

CDU controller 168 also transmits a start signal to the set input terminal of flip-flop 177 at the beginning of a control message transmission function. The logical "1" output of flip-flop 177 is applied to an AND gate 178, the output terminal of which is connected to the gating control terminal of output register 173. Additionally, AND gate 178 receives as an input the signal $t_{62}$. Thus, after flip-flop 177 is set, a logical "1" pulse is delivered to output register 173 in response to each signal $t_{62}$. Each control word transmitted to output register 173 is transmitted to a CDU output circuit 179 during the time slot TS 62 in response to the $t_{62}$ pulses. Prior to the setting of flip-flop 177, no signals are gated to CDU output circuit 179.

Each control word read from first-in/first-out buffer 171 is also applied to the inputs of an end compare circuit 180 which is substantially identical to the end compare circuit 163. When end compare circuit 180 detects that the character being transmitted from first-in/first-out buffer 171 to output register 173 is the end character, it generates a logical "1" pulse which is transmitted via a delay circuit 181 to the reset terminal of flip-flop 177. Delay circuit 181 delays the logical "1" pulse from end compare circuit 180 for a period of time greater than one time slot. In this manner, flip-flop 177 is reset to inhibit the transmission of further $t_{62}$ signals to output register 173 after the transmission of the end character.

CDU output circuit 179 is a multiplexor having 256 input ports and one output port. The first 62 of the input ports are each uniquely associated with one of the time-slot output registers, e.g., 173 and 174. In response to time-slot count signals from timing circuit 155 control distribution unit output circuit 179 transmits a control word from one of the output registers, e.g., 173 and 174, to its output port. The output port is in turn connected to link interface circuit 152 which operates as previously described to transmit the control words received thereby to time multiplex switching unit 10.

Central control 30 also generates control messages to be transmitted to the control units, e.g., 17 and 18. Each control message generated by central control 30 includes a destination portion defining the particular control unit which is to receive the control message. Control messages are transmitted from the central control 30 to the control distribution unit control 168 via communication path 32. Control distribution unit control 168 stores each control message received from central control 30 and as previously described, reads each stored destination portion to determine the control unit for which the control message is intended. Control distribution unit control 168 transmits control messages from central control 30 in the same manner that it transmits control messages received from the first-in/first-out buffers 160 and 161. The following is an example of call setup and removal in the present embodiment. In the example, a subscriber at subscriber set 23 wishes to call subscriber 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and timeslot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class of service.

Figure 8:
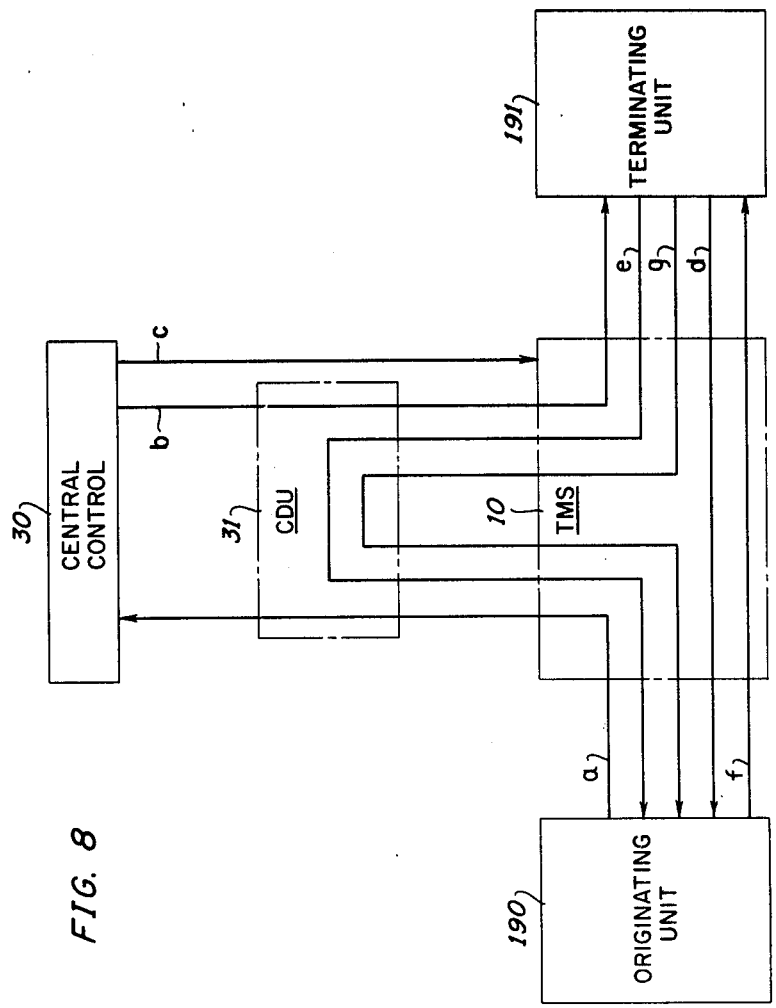
FIG. 8 is a functional diagram of the call completion control messages exchanged by the distributed processors of the embodiment shown in FIG. 1.

FIG. 8 is a functional diagram of the communication among the processors for the establishment of a call between subscribers. In FIG. 8 originating unit 190 represents originating subscriber set 23, line unit 19, time-slot interchange unit 11, and control unit 17. Similarly, terminating unit 191 represents terminating subscriber 26, line unit 22, time-slot interchange unit 12, and control unit 18. Each communication in the call completion sequence is represented in FIG. 8 by a line, terminating with an arrowhead to indicate its direction, having an associated letter (a) through (g). In the course of the following discussion, the letters (a) through (g) are used to identify the particular communication being discussed. The control message (a) formulated by control unit 17 of the originating unit 190 is transmitted, as previously described, one control word per frame in the control channel of time multiplex line 13. In the present embodiment, the time multiplex line associated with an odd-numbered input/output port is the primary time multiplex line used to convey control messages. The time multiplex line associated with an even-numbered input/output port pair is utilized to convey longer messages such as program and/or data update messages. Accordingly, the control channel of time multiplex line 13 is used to convey the control messages in the present example. The control words in this control channel are switched by time multiplex switch 10 to the control distribution unit 31 during the time slot associated with that control channel. As previously described, control distribution unit 31 interprets the destination portion of the message received and transmits the message to central control 30.

Central control 30 computes the identity of the time-slot interchange unit associated with the called party identity and assigns an idle time slot for communication between called and calling parties. In the present example, it is assumed that time slot 16 is selected for this communication. Central control 30 then transmits a control message (b) to time-slot interchange unit 12 of terminating unit 191 which is connected to subscriber set 26 via the control distribution unit 31 and time multiplex switch unit 10. This control message (b) comprises the called subscriber identity, the identity of time-slot interchange unit 11 which is connected to the calling party and the time slot to be used for communication through time multiplex switch unit 10. At substantially the same time that central control 30 transmits the control message (b) to time-slot interchange unit 12, it transmits instructions (c) to control memory 29 via communication path 49 which instructions define the switching paths to be used during time slot 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and begins transmission of the logical "1" E-bit (d) in the channel associated with subscriber set 26 to the time multiplex switching unit 10. It will be remembered that a control unit controls the transmission of logical "1" E-bits in a given channel by accessing the storage location of RAM 55 associated with that channel and setting its E-bit position to a logical "1". Further, control unit 18 formulates a control message defining the identities of time-slot interchange unit 12 of the terminating unit 191, the time slot (time slot 16) which is to be used for the communication, and any information about subscriber 26 which is necessary for control unit 17 to complete the call. This control message (e) is transmitted to time-slot interchange unit 11 of originating unit 190 via the control channel to time multiplex switch unit 10, the control distribution unit 31 and back through time multiplex switch unit 10 in the control channel associated with time-slot interchange unit 11. In addition to the above, processor 66 of control unit 18 instructs E-bit check circuit 192 to survey the state of the E-bit in time slot 16 for a predetermined period of time, e.g., 128 frames.

Control unit 17, in response to the message from control unit 18 begins to transmit in the channel associated with subscriber set 23 a logical "1" E-bit (f) to time multiplex switch unit 10. Further, control unit 17 of the originating unit 190 checks the E-bit of the incoming channel 16 from time-slot interchange unit 12 for the presence of a logical "1". When such a logical "1" E-bit is received, a continuity signal is transmitted from E-bit check circuit 192 to processor 66 of control unit 17 indicating that communication path continuity from time-slot interchange unit 12 to time-slot interchange unit 11 is known. When communication path continuity exists from time-slot interchange unit 11 to time-slot interchange unit 12, E-bit check circuit 192 of control unit 18 will detect a logical "1" E-bit in channel 16 during the predetermined period of time. E-bit check circuit 192 of control unit 18 transmits a continuity signal to its associated processor 66 in response to the logical "1" E-bit. In response to the continuity signal from E-bit check circuit 192 of control unit 18, line unit 22 is notified to transmit ring current to subscriber set 26 and audible ring tones are returned during time slot 16 to subscriber set 23. When subscriber set 26 is taken off-hook, line unit 22 notifies control unit 18 which removes audible ring from transmission to subscriber set 23 and the ring current applied to subscriber set 26. Control unit 18 then transmits a control message (g) over the control channel from time-slot interchange unit 12 to time-slot interchange unit 11 indicating that an answer has occurred. The parties can now communicate.

Call termination normally is controlled by the control unit associated with the calling party, which, in the present example, is control unit 17. When subscriber set 23 goes on-hook, the E-bit in the channel between subscriber sets 23 and 26 is changed to a logical "0". Control unit 18 in response to the logical "0" E-bit transmits a control message to central control 30 defining that its part of the call is completed. Further, a similar message is transmitted from control unit 17 when the on-hook is detected. In response to these two messages, central control 30 controls the control memory 29 to drop the path connecting the channels between subscriber sets 23 and 26. Further, the control units 17 and 18 make the path from their associated subscriber sets to the time multiplex switch unit 10 idle so that these paths can be used for further communications. When subscriber set 26 is the first to go on-hook, control unit 18 transmits the control message to control unit 17 via the control channel informing control unit 17 that the on-hook has occurred. Control unit 17, in response to such a message, waits for a predetermined period of time, similar to hit timing, then initiates the call termination procedure as described immediately above.

The terminating party can have certain characteristics which change the normal call completion/termination routine. For example, subscriber 26 (the terminating subscriber of the previous example) might be subject to call tracing. In this situation it is desirable that any call to subscriber 26 be held in the completed state until subscriber 26 goes on-hook. In accordance with this example, a call is established in much the same manner as described in the previous example. The first control message from time-slot interchange unit 12 to time-slot, interchange unit 11, however, will include a portion indicating that call tracing is operative on the soon-to-be-completed call. Control unit 17 in response to this control message, modifies the call termination sequence so that the completed paths are not removed until a message is received from control unit 18 indicating that subscriber 26 has gone on-hook.

It is to be understood that the above-described embodiment is merely illustrative of the principles of the invention and that other arrangements may be devised by those skilled in the art without departing from the spirit and scope of the invention.

What is claimed is:

1. A telecommunication switching system comprising a switching means, a terminating unit connected to said switching means for generating data words, an originating unit connected to said switching means for generating data words and for transmitting routing information defining said terminating unit to a control means, said control means comprising means for controlling said switching means to complete a communication path, having a unique identity, between said originating unit and said terminating unit in response to said routing information characterized in that said control means further comprises means responsive to said routing information from said originating unit for transmitting to said terminating unit a control message identifying said originating unit and further identifying said communication path;

said terminating unit further comprises terminating unit transmission means for transmitting to said originating unit a control message defining the identity of said communication path and first communication means for transmitting and receiving said data words on said uniquely defined communication path; and said originating unit further comprises second communication means responsive to said control message from said terminating unit for transmitting and receiving said data words on said communication path.

2. The telecommunication switching system in accordance with claim 1 further characterized in that said originating unit comprises originating unit acknowledgment means responsive to said control messages identifying said communication path for transmitting an originating unit acknowledgment signal to said first communication means; and said first communication means comprises means responsive to said originating unit acknowledgment signal for transmitting and receiving data words on said communication path only after said originating unit acknowledgment signal has been received by said first communication means.

3. The telecommunication switching system in accordance with claim 2 further characterized in that said originating unit acknowledgment means comprises means for transmitting said originating unit acknowledgment signal on said communication path; and said first communicating means comprises means for receiving said originating unit acknowledgment signal from said communication path and means responsive to said originating unit acknowledgment signal for enabling said first communication means to transmit and receive said data words.

4. The telecommunication switching system in accordance with claim 2 further characterized in that said terminating unit comprises terminating unit acknowledgment means responsive to said control message from said control means identifying said communication path for transmitting a terminating unit acknowledgment signal to said second communication means; and said second communication means comprises means responsive to said terminating unit acknowledgment signal for transmitting and receiving said data words on said communication path only after said terminating unit acknowledgment signal has been received by said second communication means.

5. The telecommunication switching system in accordance with claim 4 further characterized in that said terminating unit acknowledgment means comprises means for transmitting said terminating unit acknowledgment signal on said communication path; and said second communication means comprises means for receiving said terminating unit acknowledgment signal from said communication path and means responsive to said terminating unit acknowledgment signal for enabling said second communication means to transmit and receive said data words.

6. A time division switching system comprising an originating subscriber set for generating routing information, a terminating subscriber set, a first time-slot interchange means connected to said originating subscriber set, a second time-slot interchange means connected to said terminating subscriber set and means for transmitting to a switching means a control message comprising said routing information, said switching means comprising means for generating communication path identity signals identifying a communication path between said first and said second time-slot interchange means and means responsive to said communication path identification signals for completing a communication path between said first and said second time-slot interchange means characterized in that said switching means further comprises means for transmitting to said second time-slot interchange means a control message comprising said communication path identification signals;

said second time-slot interchange means further comprises second connection means responsive to said communication path identification signals from said switching means for connecting said terminating subscriber set to said communication path and means for transmitting to said first time-slot interchange means a control message comprising said communication path identification signals; and said first time-slot interchange means comprises first connection means responsive to said communication path identification signals from said second time-slot interchange means for connecting said originating subscriber set to said communication path.

7. The time division switching system in accordance with claim 6 further characterized in that said first time-slot interchange means comprises first acknowledgment means responsive to said communication path identification signals for transmitting first acknowledgment signals to said second time-slot interchange means; and said second time-slot interchange means comprises second enabling means responsive to said first acknowledgment signal for enabling said second connection means to connect said terminating subscriber set to said communication path only after said first acknowledgment signal has been received by said second time-slot interchange means.

8. The time division switching system in accordance with claim 7 further characterized in that said first acknowledgment means comprises means for transmitting said first acknowledgment signal on said communication path; and said second time-slot interchange means comprises means for receiving said first acknowledgment signal from said communication path and means for transmitting said first acknowledgment signal to said second enabling means.

9. The time division switching system in accordance with claim 8 further characterized in that said second time-slot interchange means comprises second acknowledgment means responsive to said communication path identification signal from said switching means for transmitting a second acknowledgment signal to said first time-slot interchange means; and said first time-slot interchange means comprises first enabling means responsive to said second acknowledgment signal for enabling said first connection means to connect said originating subscriber set to said communication path only after said second acknowledgment signal has been received by said first time-slot interchange means.

10. A time division switching system in accordance with claim 9 further characterized in that said second acknowledgment means comprises means for transmitting said second acknowledgment signal on said communication path; and said first time-slot interchange means comprises means for receiving said second acknowledgment signal from said communication path and means for transmitting second acknowledgment signal to said first connecting means.

11. A time division switching system in accordance with claim 10 further characterized in that said second time-slot interchange means comprises means for transmitting ringing current to said terminating subscriber set and means for transmitting audible ring signals on said communication path.

12. The time division switching system in accordance with claim 6 further characterized in that each of said control messages comprises an address portion defining the destination to which the attendant control message is to be transmitted;

said time division switching system further comprises control distribution means responsive to each control message transmitted thereto for transmitting each control messsage to the destination defined by the address portion of that control message;

said means for transmitting to a switching means a control message comprising said routing information comprises, means for transmitting to said control distribution means a control message comprising said routing information and an address portion defining said switching means;

said means for transmitting to said second time-slot interchange means a control message comprising said communication path identification signals comprise means for transmitting to said control distribution means, a control message comprising said communication path identification signals and an address portion defining said second time-slot interchange means; and said means for transmitting to said first time-slot interchange means a control message comprising said communication path identification signals comprises means for transmitting to said control distribution means a control message comprising said communication path identification signals and an address portion defining said first time-slot interchange means.

13. A time division switching system in accordance with claim 8 or 10 further characterized in that said communication path comprises a recurring series of time slots wherein each time slot comprises a plurality of bit positions; and both said first and said second acknowledgment means comprise means for transmitting acknowledgment signals comprising a predetermined binary digit transmitted in a predetermined one of said bit positions.

* * * * *